Dec. 1, 1953  H. H. WAGNER  2,660,902
DUAL CONTROL MECHANISM
Filed April 14, 1951  2 Sheets-Sheet 1

INVENTOR.
HAROLD H. WAGNER
BY
Charles M. Fryer
ATTORNEY.

Dec. 1, 1953 H. H. WAGNER 2,660,902
DUAL CONTROL MECHANISM
Filed April 14, 1951 2 Sheets-Sheet 2

INVENTOR.
HAROLD H. WAGNER
BY Charles M. Fryer
ATTORNEY.

Patented Dec. 1, 1953

2,660,902

UNITED STATES PATENT OFFICE 2,660,902

DUAL CONTROL MECHANISM

Harold H. Wagner, Peoria, Ill., assignor to Caterpillar Tractor Co., Peoria, Ill., a corporation of Illinois Application April 14, 1951, Serial No. 221,108

4 Claims. (Cl. 74—480)

This invention relates to dual control mechanisms and particularly to controls remotely situated for actuating a single adjustable part.

The mechanism herein disclosed is shown in a form adaptable for use in connection with the governor or other speed control device of an internal combustion engine but its adaptability to various other adjustable parts will be recognized as the description proceeds.

In many engine installations such as in boats or locomotives it is common practice to provide controls which permit adjustment of the speed of the engine either from the engine room or from the operator's station such as the cab or pilot house remote from the engine. Relatively complex fluid or electrically actuated controls have been used for this purpose but are undesirable because of their original cost and their intricate nature.

It is an object of the present invention to provide a mechanical dual control mechanism which permits a full-range of adjustment of the part to be controlled from either of two remotely positioned stations. It is a further object to provide a mechanical dual control in which separate control levers are latched in any position of adjustment but may be operated to obtain a full range of adjustment notwithstanding the fact that they are occasionally latched in different phase positions. Further and more specific objects and advantages of the invention will be made apparent in the following specification wherein reference is made to the accompanying drawings.

The principal parts of the mechanism are encased in a housing 10 from which projects a short shaft or coupling pin 18 adapted to be connected with a part to be adjusted for control. The coupling pin 18 is adapted to be locked to effect adjustment of the control part either by a remotely positioned lever shown at 13 in Fig. 1 or by a lever 14 carried adjacent the housing. According to the present invention, the lever 14 may be rocked to any position without respect to the position in which the lever 13 is latched so that the levers may be out of phase with respect to each other. On the other hand, the lever 13 can be used for controlling the coupling pin 18 and can be brought into phase with the lever 14 by simply swinging it to either of its two extreme positions.

Figure 1:
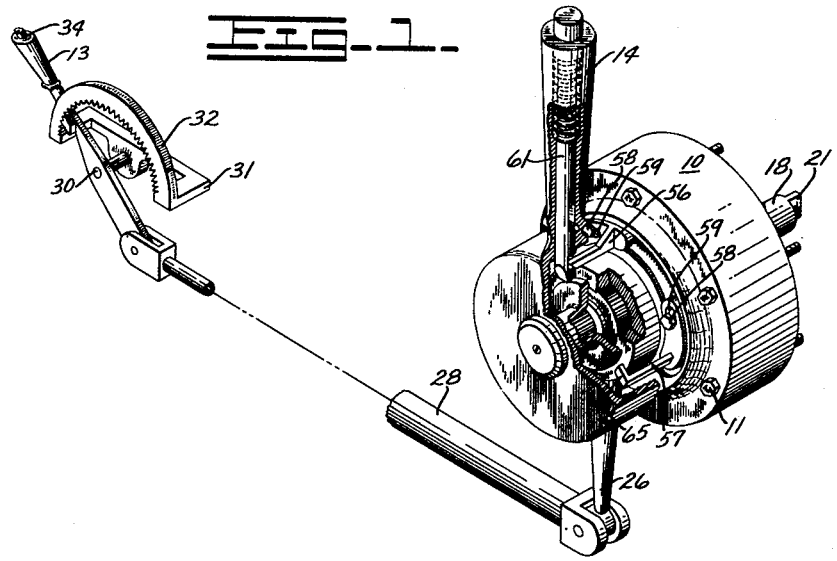
Fig. 1 is a perspective schematic view of a dual control mechanism embodying the present invention.
Figure 3:
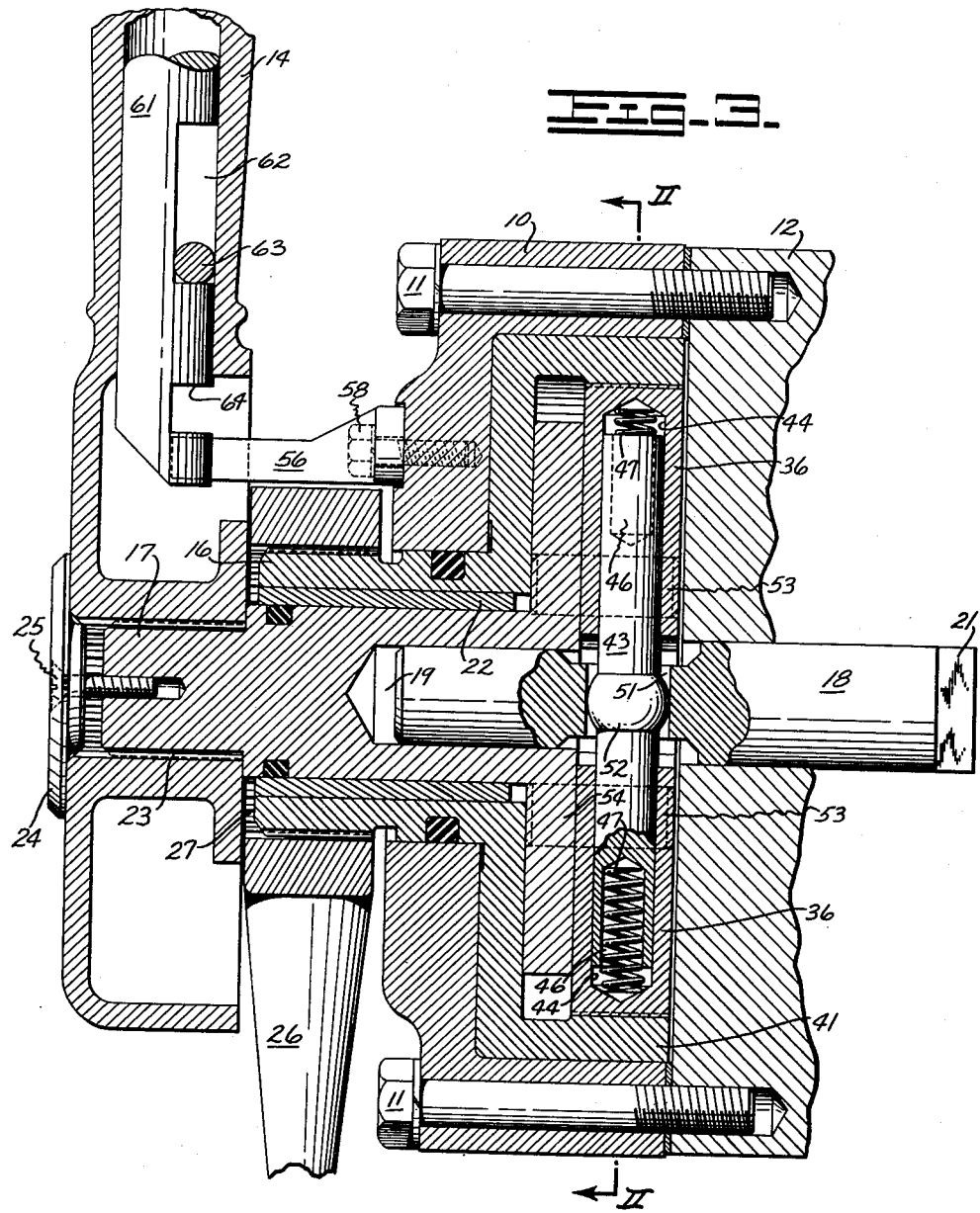
Fig. 3 is an enlarged sectional view taken on the line III—III of Fig. 2.

As best shown in Fig. 3, the housing 10 may be secured as by cap screws 11 to a wall, a fragment of which is shown at 12 which may be a part of an engine governor or any mechanism to be controlled not shown. The ends of the coupling pin 18 is provided with any non-round part such as indicated at 21 for convenience in connecting it to controllable parts of the governor which may be of any conventional type. The coupling pin 18 extends into a concentric bore 19 of a shaft 17 to which the lever 14 is secured. The shaft 17 is supported for oscillation in a bearing 22 which is in turn supported within a hollow shaft 16. A spline connection illustrated at 23 is provided between the shaft 17 and the lever 14 and a retainer 24 and screw 25 hold the lever in place on the shaft. The drive shaft 16 carries a lever 26 through a spline connection shown at 27 and as illustrated in Fig. 1, the lever 26 is connected by a link 28 with the lever 13. The link 28 is shown as a single straight link but is intended to be representative of any suitable linkage for transmitting rocking movement of the lever 13 to the lever 26 and thus to the hollow shaft 16. The lever 13 is supported on a pin 30 for rocking movement and this pin is carried by a supporting bracket 31 which also carries a semi-circular toothed quadrant 32 adapted to cooperate with a spring pressed plunger 34 to latch the lever in any position of adjustment.

Figure 2:
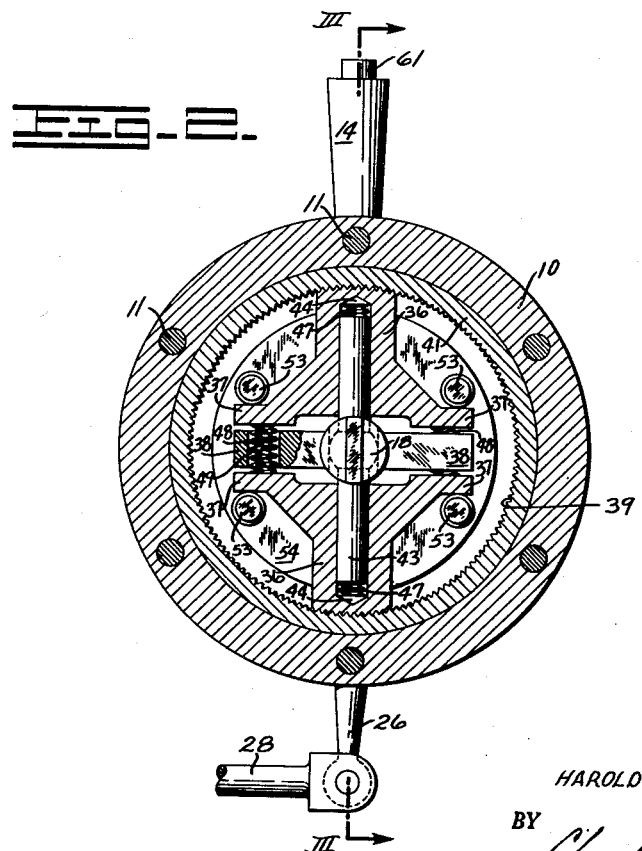
Fig. 2 is a sectional view of a part of the control mechanism taken along the line II—II of Fig. 3.

The manner in which the coupling pin 18 may be actuated either by the shaft 16 or the shaft 17 is best shown in Figs. 2 and 3. In these figures, a pair of latch members 36 are shown as having outwardly extending legs 37 exposed on opposite sides of radially extending lugs 38 carried on the coupling pin 18. The ends of the latches 36 are serrated or toothed for engagement with teeth 39 provided on the inner periphery of a cup-like flange 41 formed as a part of the driving shaft 16. These latches are guided for radial reciprocal movement by a pin 43, the opposite ends of which extend into recesses 44 in the latches. The ends of the pin are bored as indicated at 46 in Fig. 3 to receive springs 47 which tend to urge the latches outwardly into engagement with the teeth 39 so that they are normally connected for rotation with the drive shaft 16. Additional springs shown at 48 in Fig. 2 may be provided to aid in urging the latches outwardly. The guide pin 43 extends through an opening 51 in the coupling pin 18 and has a spherical enlargement 52 to provide a snug connection which permits slight rocking movement of the guide pin.

With the mechanism thus far described, the lever 13 may be employed to rock the coupling pin 18 and thus to adjust the governor to which it is connected because movement of the lever 13 rocks the lever 26 and hollow shaft 16 thus turning the latches 36 and guide pin 43 and coupling pin 18. In order to rock the coupling pin 18 by manipulation of the lever 14, the drive shaft 17 carries a flange 54 which as best shown in Fig. 2 supports four latch release pins 53 disposed adjacent the outwardly extending legs 37 of the latches 36. Thus upon rotation of the shaft 17 by the lever 14, the pins 53 act to move the latch members toward each other against the tension of the springs 47 and 48 and this movement releases the latching engagement and permits the latches to turn within the member 41 and through their engagement with the lugs 38 to rock the shaft 18. Since, upon adjustment through the lever 14 the latches are disengaged from the cup-like member 41, the lever 13 will not be moved and after such adjustment has been made, the levers 13 and 14 may be out of phase with respect to each other. With the controls out of phase, it might be impossible to obtain a complete range of adjustment with the lever 13 but the present invention includes means to enable the levers to be returned to corresponding phase positions through manipulation of the lever 13. To accomplish this, a pair of stops for the lever 14 are provided as shown at 56 and 57 in Fig. 1. These stops are adjustably secured to the housing 10 as by screws 58 which extend through elongated openings 59 in the stop supports. The stops extend outwardly from the housing to a position for engagement by a spring pressed plunger 61 reciprocably mounted in the lever 14. Where the control is used on an engine governor, the stops will be positioned to limit the movement of the lever 14 to the positions which correspond to high speed and low speed engine operation. Reciprocal movement of the plunger 61 is limited by a pin 63 (see Fig. 3) extending through the lever and through a notch 62 in the plunger. The stop 56 prevents movement of the control lever 14 beyond its low engine speed position. However, to enable the engine to be shut down by moving the lever 14 beyond this position, the plunger 61 has a notch 64 (see Fig. 3) positioned to register with and pass over the stop when the plunger is depressed. The high speed stop 57 is preferably enlarged as shown at 65 in Fig. 1 to prevent passage of the lever 14 beyond the high speed position even though the plunger may be inadvertently depressed.

Assuming that the control levers 13 and 14 are out of phase with respect to each other as might result from operation of the lever 14, they may be brought into phase by rocking the control member 13 as far as possible in one direction or the other, the direction depending upon the relative phase positions. When the lever 13 is thus rocked, the toothed cup 41 will rotate and being connected through the latches 36 and pins 53 with the shaft 17, it will impart rocking movement to the lever 14 in the same direction as the rocking movement of the lever 13 until movement of the lever 14 is interrupted by one of the stops 56 or 57. Since the lever 14 cannot rock beyond its limited position, further movement of the lever 13 will cause the teeth 39 on the flange 41 to override the toothed ends of the latches 36, this overriding being permitted by the resiliency of the springs 47 and 48. The length of the quadrant 32 may limit the movement of the lever 13 to high speed and low speed positions or, if desired, suitable stops not shown may be provided on the quadrant for this purpose. The latching pressure exerted by the springs 47 and 48 may be quite light to enable the levers to be brought into phase position in the manner just described with a minimum of manual exertion. Heavy spring pressure is not necessary because the springs are not employed to react to torque of the coupling pin 18 which may result from a governor spring or other mechanism that it controls since this torque or tendency of the pin 18 to turn is transmitted through the lugs 38 which tend to separate the latches 36 and increase the pressure of their toothed engagement with the cup 41.

I claim:

1. A dual control comprising a driven member, a first driving shaft, a second driving shaft extending through and supported for relative rocking movement in the first driving shaft, manually operable control means for each of the driving shafts, releasable locking means associated with the control means for said first driving shaft, latches engageable with the first driving shaft for transmitting torque from said shaft to the driven member, and means on said second driving shaft for disengaging the latches from said first driving shaft and transmitting torque from the second driving shaft to the driven member through said latches.

2. A dual control comprising a driven member, a first driving shaft, a second driving shaft extending through and supported for relative rocking movement in the first driving shaft, manually operable control means for each of the driving shafts, releasable locking means associated with the control means for said first driving shaft, a pair of opposed latch members normally resiliently urged apart into latching engagement with the first driving shaft for transmitting torque from said shaft to the driven member, and means on said second driving shaft for disengaging the latches from said first driving shaft and transmitting torque from the second driving shaft to the driven member through said latches.

3. A dual control comprising a driven member, a first driving shaft, a second driving shaft extending through and supported for relative rocking movement in the first driving shaft, manually operable control means for each of the driving shafts, releasable locking means associated with the control means for said first driving shaft, a cup-like flange on the first driving shaft having an internally toothed surface, a pair of opposed latch members normally resiliently urged apart into latching engagement with said internally toothed flange on the first driving shaft, driving connections between said latches and the driven member, and means on said second driving shaft for disengaging the latches from said first driving shaft and transmitting torque from the second driving shaft to the driven member through said latches.

4. A dual control comprising a driven member, a first driving shaft, a second driving shaft extending through and supported for relative rocking movement in the first driving shaft, manually operable control means for each of the driving shafts, releasable locking means associated with the control means for said first driving shaft, a cup-like flange on the first driving shaft having an internally toothed surface, a pair of opposed latch members normally resiliently urged apart into latching engagement with said internally toothed flange on the first driving shaft, a guide pin inter-connecting the latches to limit their relative movement to radially opposed directions, driving connections between said latches and the driven member, and means on said second driving shaft for disengaging the latches from said first driving shaft and transmitting torque from the second driving shaft to the driven member through said latches.

HAROLD H. WAGNER.

References Cited in the file of this patent

UNITED STATES PATENTS

| Number | Name | Date |
|---|---|---|
| 2,376,157 | Lewis et al. | May 15, 1945 |
| 2,435,037 | Gardiner et al. | Jan. 27, 1948 |
| 2,516,433 | Suska | July 25, 1950 |

FOREIGN PATENTS

| Number | Country | Date |
|---|---|---|
| 381,337 | Great Britain | Oct. 6, 1932 |